Aug. 22, 1944.  E. H. BIRDSALL  2,356,204
MAGNETIC TOGGLE OVERLOAD RELEASE
Filed April 3, 1943  3 Sheets-Sheet 1

INVENTOR.
EDWIN H. BIRDSALL
BY Harold L. Gammons
AGENT

Aug. 22, 1944.  E. H. BIRDSALL  2,356,204
MAGNETIC TOGGLE OVERLOAD RELEASE
Filed April 3, 1943    3 Sheets-Sheet 3

INVENTOR.
EDWIN H. BIRDSALL
BY Harold L. Gammons
AGENT

Patented Aug. 22, 1944

2,356,204

UNITED STATES PATENT OFFICE 2,356,204

MAGNETIC TOGGLE OVERLOAD RELEASE

Edwin H. Birdsall, Golden, Colo., assignor to Remington Arms Company, Inc., Bridgeport, Conn., a corporation of Delaware Application April 3, 1943, Serial No. 481,773

14 Claims. (Cl. 74—585)

This invention relates, in general, to force transmitting mechanism, and, in particular, to a toggle for securing a member to be operated such as a tool, or other workpiece engaging device, to an operator.

An object of the invention is to exert a predetermined load on an operated member and to unload the member immediately the predetermined load is exceeded. A further object is to exert a load on an operated member to move it into engagement with a workpiece and to stop the movement of the member immediately it has moved a predetermined distance with respect to the workpiece. A still further object is to yieldably connect a ram or other force applying means to a tool or other workpiece engaging part by yieldable means including a force transmitting toggle comprising permanent magnets. A still further object is to provide a force transmitting toggle comprising a plurality of pairs of pivotally associated permanent magnets supported in a normally closed position between an operator and an operated member and adapted to spread open to enable relative movement between said operator and operated member.

Other objects, features and advantages of the invention will be described in greater detail in the following specification which is descriptive of one embodiment of the invention, in this instance, a magnetic toggle connection between the ram and punch of a cartridge case drawing press.

It will be understood, however, that the embodiment shown is for the purposes of illustration only and that the invention is not limited thereby, but includes all modifications within the scope of the appended claims.

In many arts, and, in particular, the art of forming ammunition components involving punching, drawing, bumping, heading, tapering and similar operations, the workpieces are shaped by suitable tools, as, for instance, draw punches and dies. These are connected by suitable means to a reciprocating ram or head which is adapted to provide the required force and/or length of travel to the particular tool being operated to effect the desired forming operation.

In these operations, the force exerted by the ram on the tool must not exceed the predetermined force required to properly shape the workpiece by more than a few percent; in the same and in other operations, as, for example, primer staking, powder charging and pocket burring, the length of travel of the tool with respect to the workpiece must be within allowable tolerances of a few thousandths of an inch. The massive construction which characterizes the reciprocating ram of a draw press precludes operation of the tool to within the required tolerances, and hence it has been customary to secure the tool to the ram by a yieldable connection constructed and arranged to relieve the tool from excessive pressure or overtravel whenever the length of stroke of the ram exceeds permissible limits.

The connections used heretofore have comprised yieldable members such as coil springs, pneumatic cylinders, weights, etc., and while such devices have been more or less satisfactory for heavy work they have proven slow and inaccurate for relatively light work and especially in the manufacture of caliber .30 cartridge cases, in which the allowable tolerances for cessation of pressure impressment or length of tool travel are extremely small.

Figure 1:
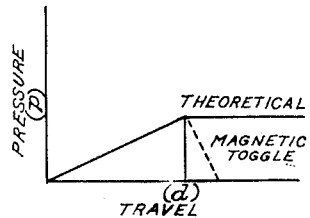
Fig. 1 is a pressure travel diagram showing the curve of a theoretical yieldable connection and the curve of the magnetic toggle of this invention.

To be effective, the pressure displacement characteristics of the yieldable connection should approximate the relationship indicated by the curve in Fig. 1 of the drawings. It will be seen that at the point $d$ which is indicative of that point at which the connection yields to the pressure applied thereon, the pressure abruptly ceases and remains substantially uniform throughout additional movement to the yieldable connection. Although the pressure curve of a spring is theoretically a straight line, structural limitations are such that the actual curve swings upwardly, as shown in Fig. 2, indicating that the pressure is permitted to increase even after the spring begins to yield.

Figure 2:
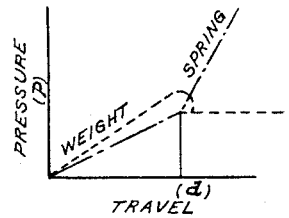
Fig. 2 is a pressure travel diagram showing the curves of a spring connection and a weight and lever connection.

Fig. 2 also shows the pressure displacement curve of a yieldable connection comprising a weight and lever. Due to certain dynamic factors introduced by this type of connection, its characteristic curve shows a sudden rise in pressure above yield point $d$. Obviously, both the spring and weight types of yieldable connections preclude quick and absolute unloading at predetermined loads.

The present invention is based on the fundamental principle of magnetic attraction between opposed poles and is embodied in a yieldable connection comprising opposed magnets wherein the cohesive force holding the magnets together varies inversely as the square of the distance separating the magnets. Accordingly, the collapse of this yieldable connection and immediate drop in pressure on the tool occurs substantially simultaneously as shown by the pressure displacement curve in Fig. 1. By providing a yieldable connection of this type, the tool will be unloaded immediately when subjected to a predetermined pressure and hence drawing and similar operations which require a specific pressure to within very close percentages can be accurately controlled. Similarly, where it is necessary to stop the tool at the end of a predetermined stroke, the immediate and complete yielding of the connection between the tool and tool operator insures accurate performance in primer staking, compacting and compressing of charges of pulverent or granular material (powder charging) and similar operations.

Figure 3:
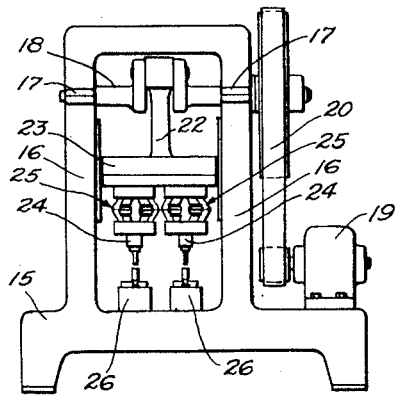
Fig. 3 is a schematic front elevation of a draw press.

The yieldable connection of this invention is embodied for purposes of illustration in a well known type of draw press shown in Fig. 3 for shaping ammunition components such as cartridge cases and similar metallic tubular articles.

The draw press shown comprises a base 15 having a pair of spaced vertical frame members 16 thereon provided at their upper ends with horizontally aligned journals 17 for rotatably supporting a crank shaft 18 which is driven from a suitable power source 19 by a belt and pulley connection indicated generally at 20. The pitman 22 of the crank shaft is connected to a gate or ram 23, hereinafter termed an operator, which is adapted to be reciprocated vertically between the frame members 16. The operator 23 shown in Fig. 3 is connected by means of the improved yieldable connection of this invention, indicated generally at 25, to a pair of tool holding members hereinafter termed operated members 24. A pair of workpiece supporting dies 26 are supported on the base 10 immediately beneath the tools of the operated members 24, the workpieces being fed to the dies by suitable feeding means not shown.

Figure 4:
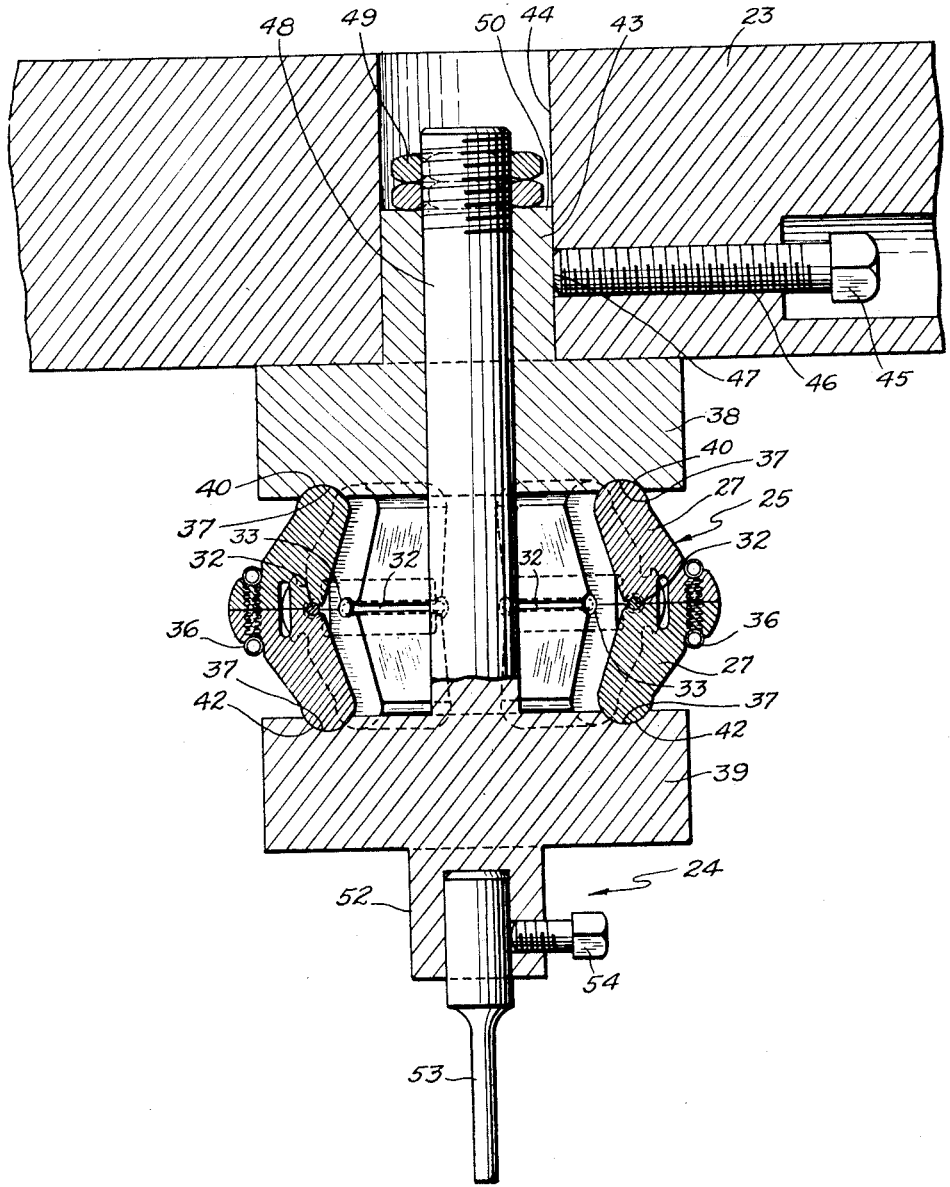
Fig. 4 is an elevation partly in section of the yieldable connection of this invention.

The improved yieldable connections between the operator 23 and operated members 24 are shown in detail in Fig. 4, each comprising, in part, a plurality of separate toggles 25 adapted to be supported in a substantially vertical plane and spaced circumferentially about the longitudinal axis of the tool of one of the operated members 24.

In the embodiment shown, each toggle comprises a pair of blocks 27, 27 of a permanent magnetic material such as the nickel-aluminum-steel alloy used for permanent magnets known commercially as "Alnico" magnets. The characteristic residual induction and coercive force of these magnets renders them especially suited for the magnetic toggles of this invention.

Figure 7:
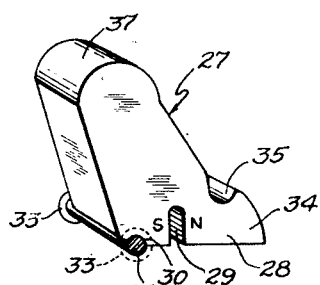
Fig. 7 is a perspective of one magnet of a pair forming a magnetic toggle.

It will be understood, however, that the invention is not limited to the use of the "Alnico" magnets but that other suitable materials may be used. In this connection, it should be pointed out that the design and geometry of each block 27, see Fig. 7, is determined both by consideration of the properties of the particular magnetic material used as well as by recognition of the mechanical strength of these materials, their weight, and the limitations imposed by the available space and design of other elements of the machine or device with which the magnets are to be associated. It is well known that for magnets having the same total magnetomotive force, the length of magnets comprising an oxide-nickel-aluminum or a cobalt-molybdenum alloy would be considerably shorter than magnets consisting of cobalt or a cobalt-tungsten alloy.

On the other hand, the required cross sectional areas of the cobalt and cobalt-tungsten alloy magnets would be much less than those required for the materials having higher coercive forces.

Figure 6:
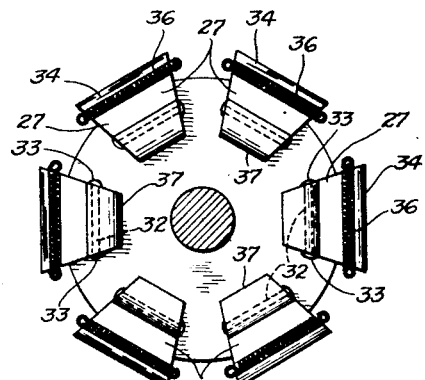
Fig. 6 is a plan view of the toggles shown in Fig. 5.

The shape of the magnetic blocks 27 which have been found most effective for use as members of the magnetic toggles are shown in Figs. 6 and 7. In general, each block is prismatic and shaped in cross sectional plan view substantially like a truncated isosceles triangle and in side elevation substantially like a truncated obtuse triangle. The base 28 of the block 27 is provided with a longitudinal slot 29 which extends from one side of the block through to the opposite side and divides the base into two magnetic poles of opposite polarity. At the left hand edge of the base, as seen in Fig. 7, and extending longitudinally thereof is a substantially semicircular slot adapted to provide a bearing surface 30 for a pivot pin 32 which is retained between the surface 30 and a corresponding bearing surface 30 of the second magnetic block 27 of the pair of magnets forming a single toggle, as shown in Fig. 4. A suitable head 33 is provided on each end of the pivot pin to retain the pin against longitudinal movement in its bearings.

Figure 5:
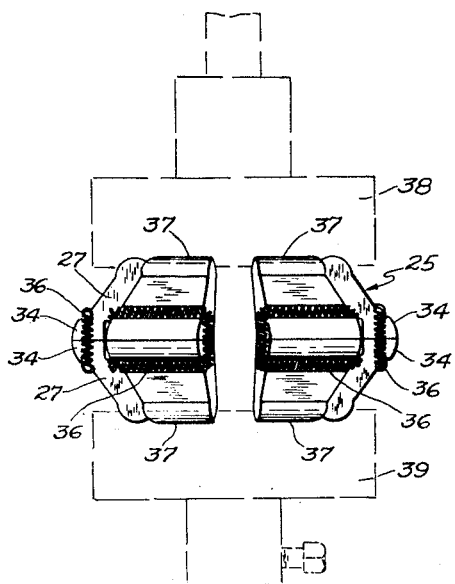
Fig. 5 is an elevation of the assembled magnetic toggles.

At the right hand edge of the base 28, each block is provided with a lip portion 34 having a longitudinally extending groove 35 in its upper surface for accommodating a portion of an annular coil spring 36 which is adapted to encircle the adjacent lips of both magnetic blocks 27 when they are assembled in the form of a toggle as shown in Fig. 5. These springs 36 are long enough so that they exert substantially no force to hold the magnets closed in their normal position; moreover, the springs do not restrain the magnets from breaking or spreading open during normal operation provided that the degree of spreading of the adjacent magnets does not exceed a predetermined amount. If, however, the magnets are spread open an amount such as to exceed the inherent restoring or coercive force of the magnets then the coil springs will augment the force of the magnets to restore them to their normal closed position.

The upper end of each block is formed with a substantially semicylindrical surface 37 which constitutes a journal for rotatably supporting the block on either the operator or operated member as indicated in Fig. 4. To this end, both the operator 23 and operated member 24 comprises a toggle supporting bearing plate 38 and 39 respectively, each having a plurality of semicylindrical recesses 40 and 42 spaced circumferentially about and equi-distant radially from the center of the bearing plate to provide bearing surfaces for the semicylindrical journal portions 37 of each magnetic block.

The upper bearing plate 38 is the flange portion of a cylindrical sleeve 43 which is adapted to project up into an aperture 44 in the operator 23 and to be fixedly secured therein by a suitable means such as the screw bolt 45 which is threaded into a drilled hole 46 in the operator so that the end 47 of the bolt bears against the exterior surface of the sleeve 43.

The lower bearing plate 39 of the operated member 24 constitutes the flange of a cylindrical guide post 48 which has a sliding fit in the sleeve 43 and is supported therein by means of a pair of adjusting nuts 49 threadedly secured on the upper end of the post and adapted normally to seat on the end or shoulder 50 of the sleeve 43. An axially drilled concentric boss 52 is formed on the underside of the flange 39 for supporting the workpiece engaging tool 53 which is removably secured in the boss by a screw bolt 54.

The sleeve 43, guide post 48 and nuts 49 constitute elements of the yieldable connection which enable the operated member 24 to move upwardly freely with respect to the operator 23, but prevent the operated member from dropping down out of the operator. By means of the nuts 49, the flange 39 of the operated member may be adjusted to a predetermined distance with respect to the flange 38 of the operator so that the pairs of magnets 27 which comprise the magnetic toggles may be supported between the flanges 38 and 39 with the journal portions 37 of the magnets seated in the bearing recesses 40 and 42 respectively of the flanges and the adjacent magnetic surfaces of each pair of magnets in normal closed relationship as shown in Fig. 4.

Figure 9:
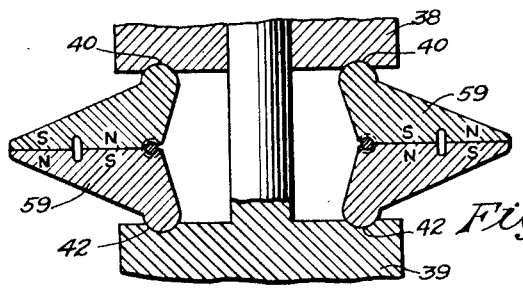
Fig. 9 is a sectional elevation of a modified shape of magnet used for the magnetic toggles.

In the embodiment shown, the yieldable connection includes a set of six magnetic toggles equally spaced circumferentially about the longitudinal axis of a tool. It will be understood, however, that the particular construction shown is merely exemplary and that the number of magnetic toggles used may be more or less than shown. Moreover, obvious modifications in the shape and size of the magnets may be made, as exemplified in Fig. 9, with attention to the particular magnetic properties of the magnets 59 and their physical characteristics as discussed above.

In operation, as the ram or operator 23 moves the tool or draw punch 53 down into engagement with the workpiece, the pressure exerted on the punch 53 increases in proportion to the work being done on the workpiece until a critical pressure is reached beyond which either or both the workpiece and punch would be destroyed. Precisely at this critical pressure the resistance of the magnetic toggles to breaking is exceeded whereupon the adjacent magnetic surfaces of each toggle separate enabling a substantially complete collapse of the toggles.

The guide post 48 is thus freed to slide upwardly in the sleeve 43 thereby effecting an immediate reduction in pressure on the tool. In this connection, it will be noted that the resistance of each toggle to breaking or separation under load can be predetermined to meet any requirement. Assuming a constant coercive force between the adjacent faces of the magnets, the resistance of the toggle to breaking or spreading is a trigonometric function of the relationship of the line of center, or line joining the centers of the journals 37 of each pair of magnets, to the off-center location of the toggle knee or pivot point 32.

As pointed out above, the coil springs 36 of each toggle do not normally resist the opening or spreading of the toggles; however, if the downward movement of the operator 23 continues after the operated member 29 has stopped so that the magnetic toggles are spread open an amount beyond the limits of the restoring force of the magnets, the coil springs will be stressed. Thereafter as the operator begins to move upwardly relative to the operated member, the coil springs provide an auxiliary force which augments the coercive force of the magnets to draw the magnetic faces of the toggles together and thus re-establish the normal relationship of the parts of the yieldable connection.

Figure 8:
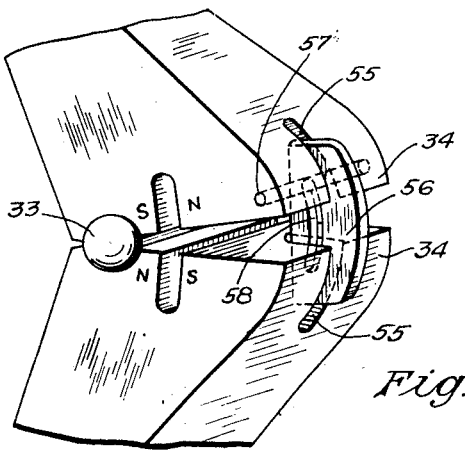
Fig. 8 shows in perspective a modification of one of the magnetic toggles having a guide means therefor.

Fig. 8 shows a modification of one of the magnetic toggles wherein a pair of vertically aligned open ended slots 55 are formed in the vertical plane of the toggle substantially midway of the faces thereof and a suitable guide means comprising a metal blade 56 of brass or other material is mounted therein in such a manner as to enable unrestricted breaking of the toggle, but provide guidance for the magnets during their pivotal movement.

In the embodiment shown, the blade 56 is secured in the slots 55 by means of a pin 57 driven substantially horizontally through the lip portion 34 of one of the magnets of the toggle and adapted to engage freely in a closed arcuate slot 58 in the blade 56. It will be understood, however, that other equivalent means may be provided for securing the guide blade 56 in the guide slots 55.

The yieldable connection described above and illustrated in Figs. 3 through 9 is particularly adapted for drawing, heading, tapering and similar operations wherein it is necessary to relieve the tool or die from excessive pressure immediately a predetermined pressure has been reached.

Figure 10:
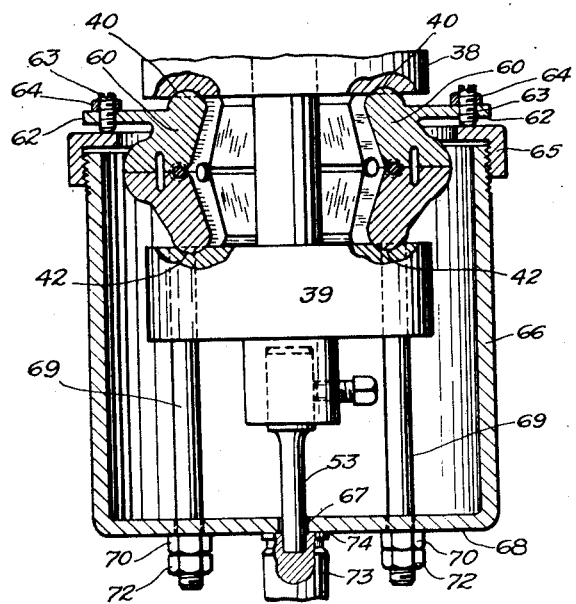
Fig. 10 is an elevation partly in section of a modification of the magnetic toggle of Fig. 4 showing a toggle casing for positively breaking the toggle.
Figure 11:
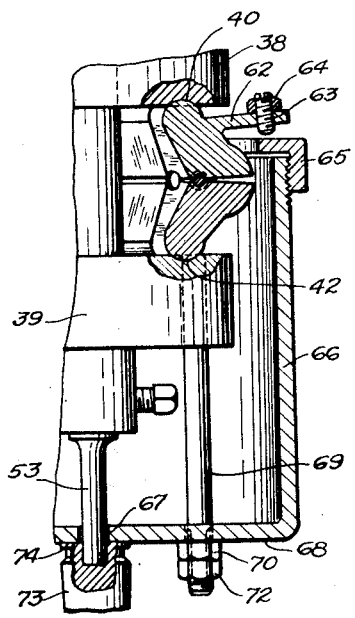
Fig. 11 is a fragmentary view of the toggle shown in Fig. 10 after the toggle has been broken.

A modification of this yieldable connection is shown in Figs. 10 and 11, wherein the magnetic toggle is constructed and arranged to collapse and thereby prevent further movement of the punch beyond a predetermined point with respect to the workpiece. This form of yieldable connection is particularly adapted for primer staking, compressing pulverant or granular material, pocket burring and similar operations.

The upper magnet 60 of each magnetic toggle is provided with a laterally extending arm 62 having at its extremity an adjusting means comprising a stud 63 threadedly secured therein and locked in adjusted position by means of a nut 64. The adjustable stud 63 is adapted to engage on the adjustable rim 65 of a suitable stop means which in the present embodiment comprises a toggle casing 66 supported by the operated member 23 and in predetermined relation to the tool 53.

As shown, the punch 53 projects down through and has a freely sliding fit in an aperture 67 in the bottom of the casing 66. Suitable supporting means for the casing may comprise a plurality of tie rods 69 fixedly secured at their upper ends in the flange 39 of the operated member and projecting at their lower ends down through oversize apertures in the bottom of the casing. Suitable adjusting nuts 70 and lock nuts 72 threadedly secured on the lower ends of the tie rods 69 provide means whereby the underside 68 of the bottom of the casing may be located at a predetermined distance from the extreme lower end of the tool.

Thus, it will be clear that when the operator 23 moves downwardly, the tool 53 will be moved downwardly with respect to the fixed workpiece, in this instance a cartridge case 73, until the bottom 68 of the casing rests on the top 74 of the cartridge case head as shown in Fig. 10.

Further movement of the casing is thus stopped. Simultaneously, the adjusting studs 63 of the upper magnets strike on the rim 65 of the casing so that any additional downward movement of the operator, as indicated in Fig. 11, positively breaks the magnetic toggles so that this additional movement is not transmitted to the tool. By nicely adjusting the bottom 68 of the casing 66 with respect to the end of the tool and the studs 63 with respect to the adjustable rim 65, the downward movement of the tool may be stopped to within allowable tolerances of a few thousandths of an inch.

What is claimed is:

1. In a machine, an operator; an operated member; and a yieldable connection between said operator and member including a magnetic toggle, said toggle comprising a composite ring member constructed and arranged to collapse in a direction substantially perpendicular to the plane of the ring.

2. In a machine, an operator; an operated member; and a yieldable connection between said operator and member including a magnetic toggle, said toggle comprising pivotally associated normally closed magnets constructed and arranged to be spread apart to enable relative movement between said operator and said operated member.

3. In a machine, an operator; an operated member; a yieldable connection between said operator and member including a magnetic toggle, said toggle comprising pivotally associated normally closed magnets constructed and arranged to be spread apart to enable relative movement between said operator and said operated member; and means for restoring the spread magnets to their normal closed position.

4. In a machine, an operator; an operated member; a yieldable connection between said operator and member including a magnetic toggle, said toggle comprising a ring member embodying a plurality of pairs of magnets, each pair of magnets being assembled with adjacent surfaces normally in contact and constructed and arranged to be supported between said operator and said operated member; and means between the adjacent surfaces of each pair of magnets to enable pivotal movement thereof in the plane of said magnets.

5. In a machine, an operator; an operated member; a yieldable connection between said operator and member including a magnetic toggle, said toggle comprising a pair of magnets assembled with adjacent surfaces normally in contact; means between the adjacent surfaces of said magnets for pivotally securing said magnets together; and a journal portion on each magnet constructed and arranged to bear against the adjacent surfaces of said operator and operated member respectively whereby said pair of magnets is rotatably supported therebetween.

6. In a machine, an operator having a socket; an operated member having a socket and a yieldable connection between said operator and operated member including a magnetic toggle comprising a pair of magnets assembled with adjacent surfaces normally in contact; a pin between the adjacent surfaces of said magnets at substantially right angles to the longitudinal axes of said adjacent surfaces for pivotally securing said magnets together; and a journal portion on each magnet opposite said adjacent surfaces constructed and arranged to seat in the socket of said operator and operated member respectively for rotably supporting said pair of magnets therebetween.

7. In a machine, an operator having an aperture; an operated member having an element slidable within said aperture; means on said element to limit the movement of said operated member in one direction with respect to said operator; and a magnetic toggle between said operator and said operated member to resist relative movement between said operator and said operated member in the opposite direction when a predetermined force is exerted by said operator on said operated member, said magnetic toggle being constructed and arranged to collapse when the force exerted on said operated member exceeds the predetermined force.

8. In a machine for shaping workpieces, a reciprocating head having an aperture and a sleeve bearing secured in said aperture, said sleeve having a shoulder; an operated member including a workpiece engaging tool and a stem, said stem being slidable in said sleeve bearing; means on the end of said stem adapted to engage said sleeve shoulder to secure said operated member to said reciprocating head during movement thereof away from said workpiece; and a magnetic toggle supported between said reciprocating head and said operated member adapted to yield when the force exerted by said head on said tool exceeds a predetermined force to enable said stem to slide in said sleeve bearing and thereby to relieve said tool from said excessive force.

9. In a machine, an operator; an operated member; a yieldable connection between said operator and member including a magnetic toggle, said toggle comprising pivotally associated normally closed magnets constructed and arranged to be spread apart to enable relative movement between said operator and operated member; and guide means for retaining said magnets in pivotally associated relationship while they are being spread apart and returned to their normal closed position.

10. In a machine, an operator; an operated member; a yieldable connection between said operator and member including a magnetic toggle, said toggle comprising pivotally associated normally closed magnets having aligned slots, said magnets being constructed and arranged to spread apart to enable relative movement between said operator and said operated member; and guide means comprising a relatively thin blade-like member supported within said aligned slots for retaining said magnets in pivotally associated relationship while they are being spread apart and returned to their normal closed position.

11. In a machine, an operator; an operated member; a yieldable connection between said operator and member including a magnetic toggle; and trigger means constructed and arranged to positively actuate said toggle.

12. In a machine, an operator; an operated member; a yieldable connection between said operator and member including a magnetic toggle, said toggle comprising at least one pair of pivotally associated normally closed magnets constructed and arranged to be spread apart to enable relative movement between said operator and said operated member; and trigger means including an arm on one magnet of said pair of magnets for positively initiating the spreading of said magnetic toggle.

13. In a machine for shaping workpieces, a reciprocating operator; an operated member including a workpiece engaging tool and an adjustable stop slidably supported on said tool; a yieldable connection between said operator and operated member comprising a magnetic toggle embodying at least one pair of normally closed pivotally associated magnets constructed and arranged to be spread apart to enable relative movement between said operator and tool; and trigger means comprising an arm extending laterally from one magnet of said pair of magnets and arranged to engage said adjustable stop to spread said magnets when said tool has moved a predetermined distance into said workpiece.

14. In a machine, an operator; an operated member; a yieldable connection between said operator and member including a magnetic toggle, said toggle comprising at least one pair of pivotally associated normally closed magnets constructed and arranged to be spread apart to enable relative movement between said operator and said operated member; trigger means comprising an arm on one magnet of said pair of magnets; and an adjustable stop member carried by said operated member and fixed relative to said operator adapted to be engaged by said arm for positively initiating the spreading of said magnetic toggle.

EDWIN H. BIRDSALL.